United States Patent
Lim

(10) Patent No.: US 8,489,888 B2
(45) Date of Patent: Jul. 16, 2013

(54) PROCESSOR APPARATUS HAVING A SECURITY FUNCTION

(75) Inventor: Min-soo Lim, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 661 days.

(21) Appl. No.: 12/381,114

(22) Filed: Mar. 6, 2009

(65) Prior Publication Data

US 2009/0228711 A1 Sep. 10, 2009

(30) Foreign Application Priority Data

Mar. 6, 2008 (KR) .......... 10 2008 0021031

(51) Int. Cl.
*G06F 21/00* (2006.01)

(52) U.S. Cl.
USPC .............. 713/182; 726/26; 713/187

(58) Field of Classification Search
USPC .............. 713/182, 183, 187; 726/26, 726
See application file for complete search history.

(56) References Cited

U.S. PATENT DOCUMENTS

| | | | |
|---|---|---|---|
| 5,265,163 A * | 11/1993 | Golding et al. | 726/19 |
| 6,622,184 B1 * | 9/2003 | Tabe et al. | 710/36 |
| 7,073,064 B1 * | 7/2006 | Angelo et al. | 713/176 |
| 7,689,819 B2 * | 3/2010 | Yu et al. | 713/2 |
| 7,831,839 B2 * | 11/2010 | Hatakeyama | 713/187 |
| 2004/0051313 A1 | 3/2004 | Trouyet | |
| 2007/0094507 A1 * | 4/2007 | Rush | 713/176 |
| 2010/0217964 A1 * | 8/2010 | Peterka et al. | 713/2 |

FOREIGN PATENT DOCUMENTS

| | | |
|---|---|---|
| JP | 06243016 | 9/1994 |
| KR | 1020030055702 A | 7/2003 |
| KR | 1020030087874 A | 11/2003 |

OTHER PUBLICATIONS

Asaf Ashkendazi Jun. 2005 Security Features in the i.MX31 and i.MX31L Multimedia Applications Processors, pp. 1-12 Freescale Semiconductor.*

* cited by examiner

*Primary Examiner* — Jung Kim
*Assistant Examiner* — Ghodrat Jamshidi
(74) *Attorney, Agent, or Firm* — Onello & Mello, LLP

(57) ABSTRACT

A processor apparatus capable of operating in a security mode includes a hash value storage unit and a security control unit including a plurality of access authentication hash values. The hash value storage value stores a plurality of hash values including a user authentication hash value and a plurality of access authentication hash values. The security control unit checks whether a boot code transmitted from a boot memory and a hash value from among the hash values, which corresponds to the boot code, are identical, and determines whether a boot operation and a debugging operation of the processor apparatus are allowed and whether an external user is allowed to have access to a predetermined intellectual property (IP) block. The processor apparatus can ensure debugging, security for the processor itself or security for a predetermined block included in the processor apparatus.

18 Claims, 5 Drawing Sheets

FIG. 5

| FUCTION | VALUE | UNIT |
|---|---|---|
| BLOCK ERASE TIME | 700 | ms |
| 4KB PROGRAM TIME | $18 = \frac{4K}{2} \times 9us$ | ms |
| FAST READ ACCESS TIME | 70 | ns |
| 4KB READ ACCESS TIME | $140 = \frac{4K}{2} \times 70ns$ | us |
| ERASE/PROGRAM ENDURANCE | 100K | cycles |

PROCESSOR APPARATUS HAVING A SECURITY FUNCTION

CROSS-REFERENCE TO RELATED APPLICATIONS

This application claims the benefit of Korean Patent Application No. 10-2008-0021031, filed on Mar. 6, 2008, in the Korean Intellectual Property Office, the disclosure of which is incorporated herein in its entirety by reference.

BACKGROUND

The inventive concept relates to a processor apparatus, and more particularly, to a processor apparatus having a security function with respect to a debugging operation, access to a predetermined intellectual property (IP) block, and the processor apparatus itself.

In a memory device, in a processor using the memory device and in a system apparatus using the memory device, security and protection of stored data have become very important. In particular, it is increasingly important that unauthorized access to the processor itself and exposure of the processor be prevented by maintaining processor security. In a secure processor or system, one without access rights to predetermined data, or to a processor, or to a predetermined block internally included in the processor, is prevented from access.

However, such devices, and systems employing such devices, are highly vulnerable to attacks by ill-intentioned users. Such users include unspecified individuals who try to falsify or use a memory device, a processor or a system apparatus and try to prevent an authorized user access to the memory device, the processor or the system apparatus. That is, an ill-intentioned user intentionally tries to falsify data stored in the memory device, to change an operation of the processor, or to expose information or a structure of the processor.

For example, when a boundary scan method is used, data of a processor apparatus or memory device can be read, and stored data can be falsified. In the boundary scan method, all operations of the memory device may be performed by a user making one-to-one connections between test pins and pins of the memory device, and the performance of a device can be tested. The definition and detailed structure of the boundary scan method would have been obvious to one of ordinary skill in the art.

That is, an ill-intentioned user can expose and falsify data of a processor apparatus or memory device by using a boundary scan method. In this case, security of the processor apparatus or memory device can be compromised.

Another example of security exposure is the case where a debugging operation of a processor is performed using a joint test action group (JTAG) port. When processor debugging is performed, an ill-intentioned user can change an operation of the processor or can expose secure information of the processor, without the permission of an authorized user. The JTAG port refers to a port that is separately provided in the processor, for facilitating a debugging operation. The definition and detailed structure of the JTAG port would have been obvious to one of ordinary skill in the art.

Recently, in order to prevent a JTAG port from being misused, a method in which the JTAG port is permanently disabled has been suggested. However, in this case, when a problem occurs in the processor, it is impossible to perform a debugging operation to identify the defect.

SUMMARY

The inventive concept provides a processor apparatus having a security function.

According to an aspect of the inventive concept, there is provided a processor apparatus including a hash value storage unit and a security control unit.

The hash value storage unit may store a plurality of hash values including a user authentication hash value and a plurality of access authentication hash values The security control unit may check whether a boot code transmitted from a boot memory and a hash value from among the hash values, which corresponds to the boot code, are identical, and may determine whether a boot operation and a debugging operation of the processor apparatus are allowed and whether an external user is allowed to have access to a predetermined intellectual property (IP) block, The access authentication values may be not output external to the processor apparatus, and are read by the security control unit.

The security control unit may determine whether a first boot code, which is transmitted when booting of the processor apparatus is requested, is falsified, by using the user authentication hash value.

The first boot code may be a boot code which is output from the boot memory in response to control by a central processing unit (CPU) when the CPU requests the processor apparatus to perform a booting operation.

The user authentication hash value may be a hash value corresponding to the first boot code that is not falsified.

The security control unit may determine whether a value, which is converted from the first boot code by using a hash engine internally included in the processor apparatus, is identical to the user authentication hash value, and performs the booting operation when the value converted from the first boot code is identical to the user authentication hash value.

The security control unit may stop all operations of the processor apparatus when a value converted from the first boot code by using a hash engine internally included in the processor apparatus is not identical to the user authentication hash value.

The processor apparatus may include a CPU and a joint test action group (JTAG) port performing a debugging operation of the processor apparatus.

The security control unit may determine whether the JTAG port is allowed to be connected to the CPU according to a first access authentication hash value of the access authentication hash values.

The security control unit may determine whether the JTAG port is allowed to be connected to the CPU according to whether the first access authentication hash value is identical to a second boot code transmitted when a debugging operation is requested.

The second boot code may be a boot code which is output from the boot memory in response to control by the CPU when the CPU is requested to perform the debugging operation.

The first access authentication hash value may be a hash value corresponding to the second boot code that is not falsified.

The processor apparatus may further include a plurality of IP blocks designed to have independent predetermined functions, wherein the predetermined IP block is at least one IP block from among the plurality of IP blocks, which requires a security operation for access.

The security control unit may determine whether the external user is allowed to have access to the predetermined IP block by using a second access authentication hash value of the access authentication hash values.

The processor apparatus may further include a bus interconnector connecting the CPU, the at least one predetermined IP block and the security control unit to each other; and at least one switch connecting the bus interconnector to the at least one predetermined block, wherein the security control unit may control the at least one switch to be turned on when the second access authentication hash value is identical to a third boot code.

The security control unit may include a security algorithm unit storing a hardwired type security algorithm; a security level control unit determining whether the boot code is identical to a hash value corresponding to the boot code of the hash values; and a security level authentication unit determining whether a hash value from among the hash values, which corresponds to the boot code, is identical to the boot code, according to a result of the determination and including a security level authentication unit adjusting and controlling an operation corresponding to the boot code.

BRIEF DESCRIPTION OF THE DRAWINGS

Exemplary embodiments of the inventive concept will be more clearly understood from the following detailed description taken in conjunction with the accompanying drawings in which:

FIG. 5 is a table for explaining interface timing of a boot memory, according to an embodiment of the inventive concept.

DETAILED DESCRIPTION OF THE EMBODIMENTS

Figure 1:
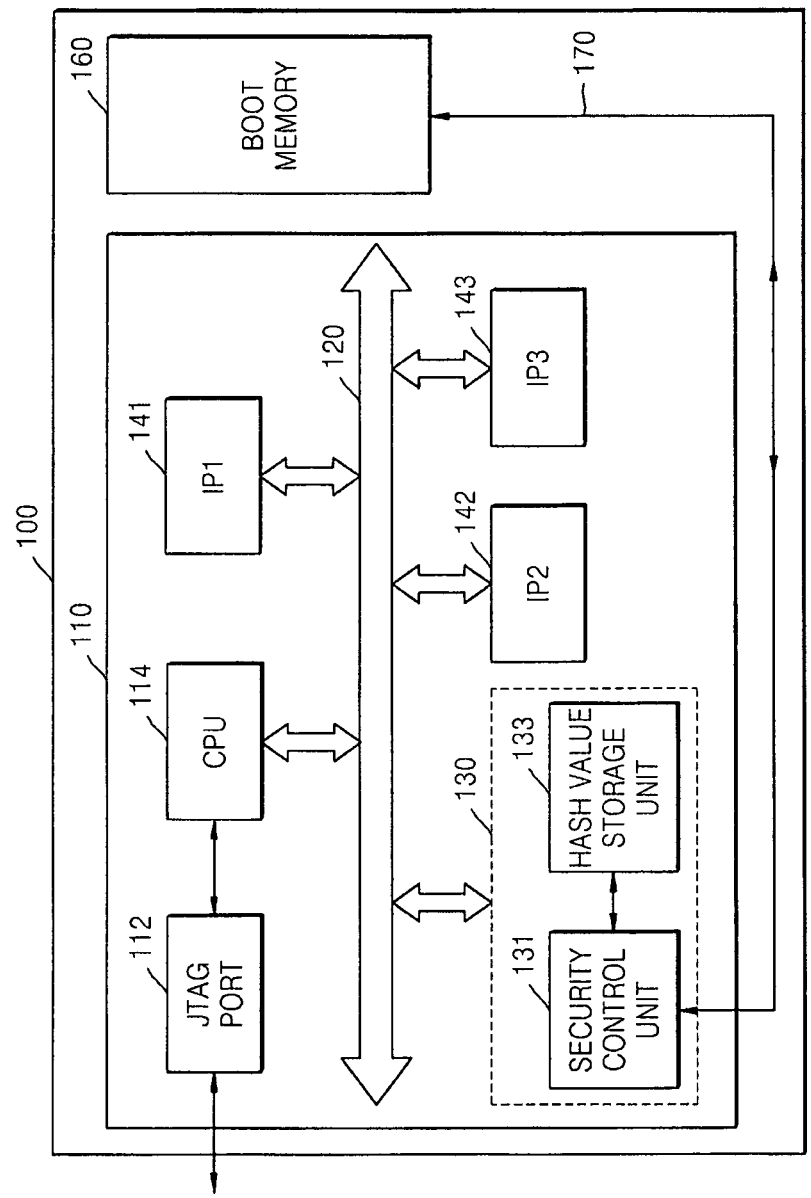
FIG. 1 illustrates a block diagram of a processor apparatus according to an embodiment of the inventive concept.

The attached drawings for illustrating preferred embodiments of the inventive concept are referred to in order to gain a sufficient understanding of the inventive concept, the merits thereof, and the objectives accomplished by the implementation of the inventive concept.

Hereinafter, the inventive concept will be described in detail by explaining exemplary embodiments of the inventive concept with reference to the attached drawings. Like reference numerals in the drawings denote like elements.

FIG. 1 illustrates a processor apparatus 110 according to an embodiment of the inventive concept.

Referring to FIG. 1, the processor apparatus 110 includes a security unit 130 in turn including a hash value storage unit 133 and a security control unit 131. The processor apparatus 110 can further include a joint test action group (JTAG) port 112, a central processing unit (CPU) 114 and a plurality of intellectual property (IP) blocks IP1, IP2 and IP3 141, 142 and 143, where IP blocks comprise circuit blocks of varying functionality. In addition, the processor apparatus 110 may further include a bus interconnector through which the various components communicate. Reference numeral 100 of FIG. 1 denotes a system board, and may include a boot memory 160 external to the processor apparatus 110.

The hash value storage unit 133 stores a plurality of hash values including a user authentication hash value h1 and a plurality of access authentication hash values h2, h3, and so on. The plurality of hash values correspond to a plurality of boot codes stored in the boot memory 160.

The access authentication hash values h2, h3, and so on, are not output externally to the processor apparatus 110, and are read by a security control unit 131.

The security control unit 131 determines whether a boot code transmitted from the boot memory 160 and a predetermined hash value are identical. According to the determination result, the security control unit 131 determines whether a boot operation and a debugging operation of the processor apparatus 110 are allowed, and whether an external user is permitted to have access to a predetermined IP block in the processor apparatus 110. The predetermined hash value refers to a hash value corresponding to a boot code transmitted from the boot memory 160.

The security control unit 131 checks whether the boot code transmitted from the boot memory 160 appears falsified by determining whether a boot code and a predetermined hash value are identical.

The processor apparatus 110 includes the hash value storage unit 133, and internally stores hash values corresponding to boot codes, respectively, so as to perform a predetermined operation. An example of the predetermined operation may include a boot operation performed according to user authentication, a debugging operation performed by the processor apparatus 110, or the access of a predetermined IP block by an external user.

In one example, the processor apparatus 110 may perform a security operation by performing the following operation.

To perform booting of the processor apparatus 110, the boot memory 160 transmits a first boot code to the security control unit 131 through a signal line 170 under control of the CPU 114. The hash value storage unit 133 stores a user authentication hash value, the user authentication hash value being a value that is converted from a first boot code, which is not falsified, by using a hash engine.

The security control unit 131 compares the first boot code with the user authentication hash value, determines whether they are identical, and performs the boot operation if the two values are identical. If the two values are not identical, the security control unit 131 does not perform the boot operation. The security control unit 131 determines whether the first boot code and the user authentication hash value are identical by determining whether the user authentication hash value is identical to a value converted from the first boot code by using a hash engine included in the security control unit 131.

The IP blocks 141, 142 and 143 are circuit blocks designed so as to have respective predetermined functions that are independent. The IP block 141, 142 or 143 is designed so as to have an independent predetermined function according to a user's or manufacturer's intention. An external user can be allowed access or prevented access with respect to a predetermined IP block of the IP blocks 141, 142 and 143, in accordance with security measures.

As described above, the JTAG port 112 is a port used in contemporary systems to perform a debugging operation of the processor apparatus 110. In one embodiment, connection of the JTAG port 112 and the CPU 114 is allowed or not allowed under control of the security control unit 133.

In one embodiment, the boot memory 160 is external to the processor apparatus 110. The boot memory 160 stores boot codes required to perform a boot operation or predetermined operation of the processor apparatus 110. The boot memory 160 selects and outputs one boot code, under control of the CPU 114. In certain configurations, the boot memory 160 can store data that is not encrypted. Thus, in an unprotected system, data stored in the boot memory 160 can be in danger of being falsified through a boundary scan which has been described in the background section herein.

A general processor apparatus performs a booting operation by directly executing a boot code output from a boot memory. Thus, when the boot code is falsified, the security of the processor apparatus 110 cannot be maintained.

In order to ensure the integrity of the boot memory 160, a security hash algorithm and hash values are used. The hash algorithm is a security algorithm in which a plurality of input data having different sizes are converted so as to have the same size when output. The hash value refers to data passed through a hash engine and then output.

In particular, hash values corresponding to boot codes that are not falsified are stored in the hash value storage unit 133. The security of the processor apparatus 110 can be maintained by checking the integrity of the boot codes by using the hash values stored in the hash value storage unit 133.

Hereinafter, the processor apparatus 110 will be described in detail, with reference to FIGS. 2 through 4.

Figure 2:
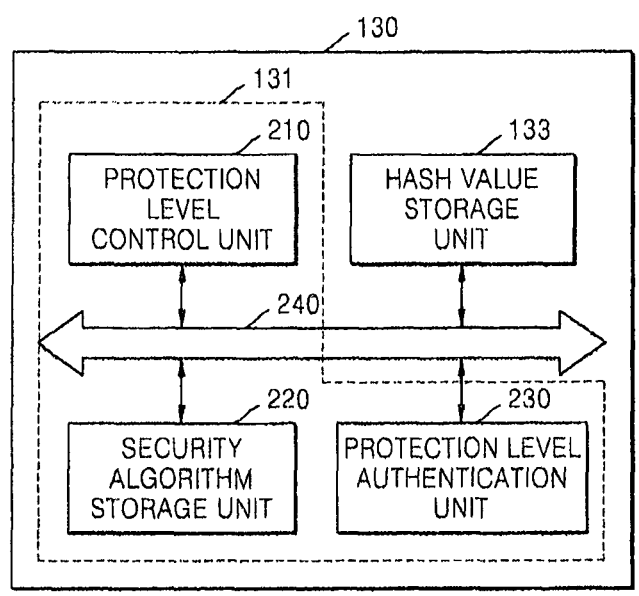
FIG. 2 illustrates a block diagram of a security control unit and a hash value storage unit of FIG. 1, according to an embodiment of the inventive concept.

FIG. 2 illustrates the security unit 130 including the security control unit 131 and the hash value storage unit 133 of FIG. 1, according to an embodiment of the inventive concept.

Hereinafter, an operation and structure of the security control unit 131 will be described in detail, with reference to FIGS. 1 and 2.

Referring to FIG. 2, the security control unit 131 can, in one embodiment, include a protection level control unit 210, a security algorithm storage unit 220 and a protection level authentication unit 230.

The security algorithm storage unit 220 stores a hardwired type security algorithm. The security algorithm is used to check the integrity of data. For example, the security algorithm may be a hash engine.

The security algorithm storage unit 220 receives a boot code output from the boot memory 160 and performs an encryption calculation to output an encrypted value. For example, when the hardwired security algorithm is a hash engine, the security algorithm storage unit 220 receives one or more boot codes, coverts the one or more boot codes into one or more boot code conversion values, and then outputs the boot codes as the boot code conversion values.

An example of the hash algorithm used to check the integrity of a boot code may include a Secure Hash Algorithm (SHA), a multidirectional search (MDS) algorithm or the like.

The protection level control unit 210 selectively reads a single hash value stored in the hash value storage unit 133, and determines whether the single hash value and the boot code conversion value are identical or not. The single hash value that is selectively read corresponds to the boot code output from the boot memory 160. The single hash value may have the same value as a value that is converted from a boot code, which is not falsified, by using a hash engine.

The protection level authentication unit 230 determines whether an operation corresponding to the boot code output from the boot memory 160 is to be performed or not, according to whether the single hash value and the boot code conversion value are identical or not, as determined by the protection level control unit 210. In addition, the operation corresponding to the boot code is regulated and controlled according to the determination result.

As a result of the determination, when the boot code conversion value and the hash value corresponding to the boot code are identical, the protection level authentication unit 230 allows the operation corresponding to the boot code to be performed. For example, when the boot code is a code for performing a booting operation of the processor apparatus 110, the protection level authentication unit 230 determines whether a user of the processor apparatus 110 has the right to perform the booting operation. As another example, when the boot code is a code for debugging the processor apparatus 110, the protection level authentication unit 230 controls the JTAG port 112 and the CPU 114 to be connected to each other in order to perform the debugging of the processor apparatus 110.

Figure 3:
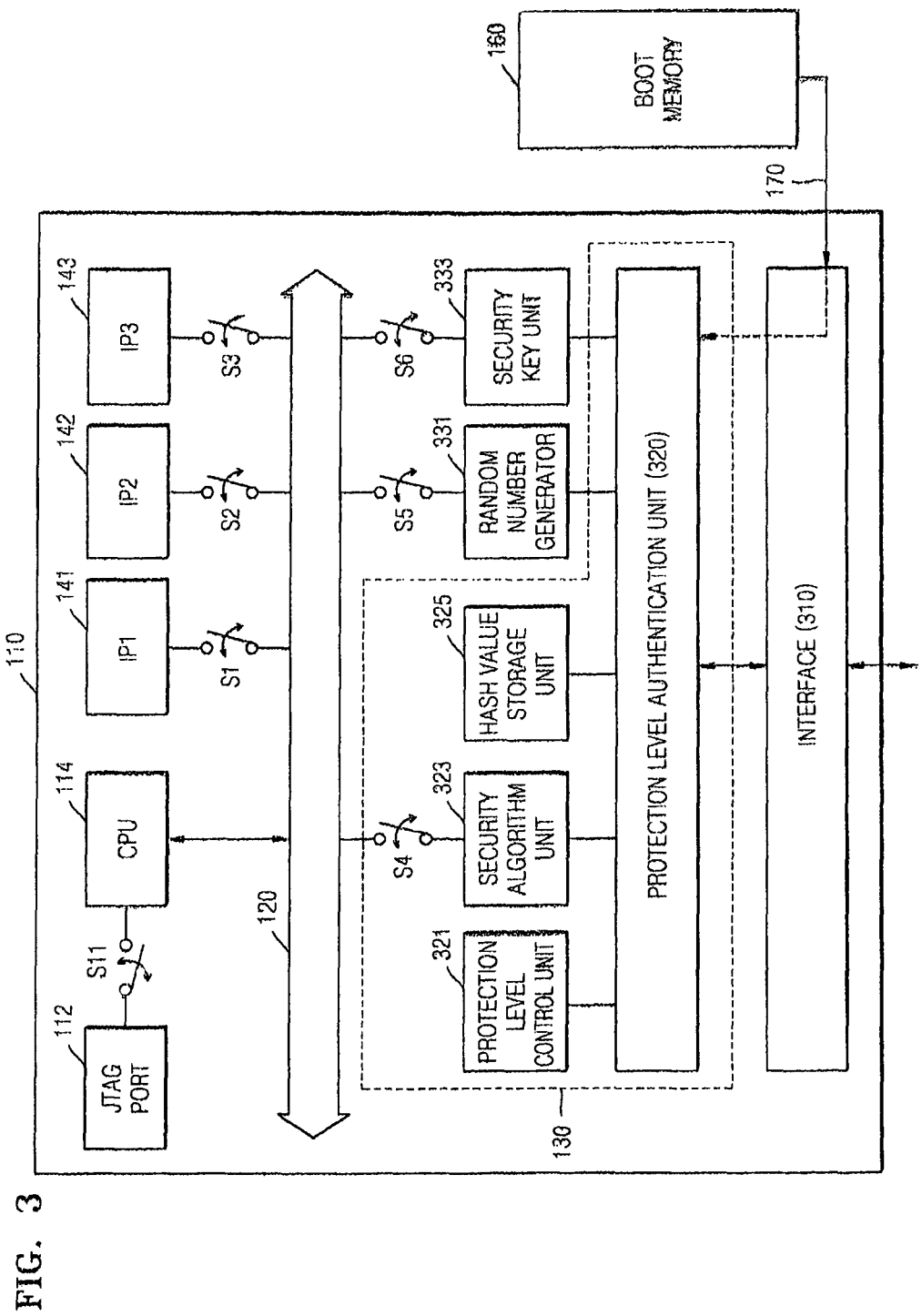
FIG. 3 illustrates a detailed block diagram of the processor apparatus of FIG. 1, in detail.

FIG. 3 illustrates the processor apparatus 110 of FIG. 1, in detail.

Figure 4:
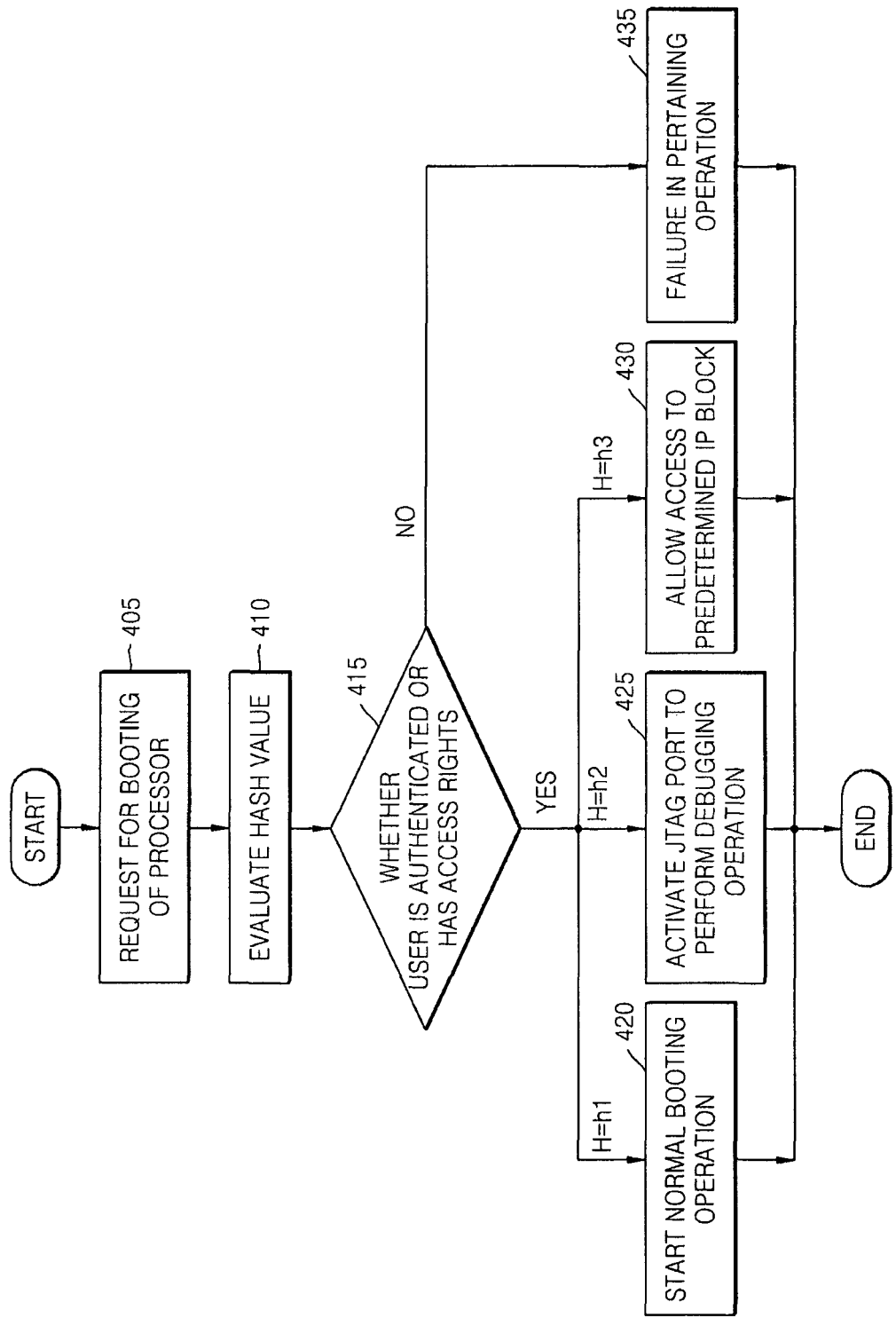
FIG. 4 is a flow chart for explaining an operation of the processor apparatus of FIG. 3, according to an embodiment of the inventive concept.

FIG. 4 is a flow chart for explaining an operation of the processor apparatus 110 of FIG. 3, according to an embodiment of the inventive concept.

Hereinafter, an operation and structure of the processor apparatus 110 of FIG. 1 will be described in detail, with respect to FIGS. 3 and 4.

Referring to FIG. 3, the configurations of the JTAG port 112, the CPU 114, the plurality of IP blocks IP1, IP2 and IP3 141, 142 and 143, the bus interconnector 120, the security control unit 130 and the boot memory 160 are the same as in FIGS. 1 and 2. Thus, their descriptions will not be repeated. For reference, a protection level authentication unit 320, a protection level control unit 321, a security algorithm unit 323 and a hash value storage unit 325 of FIG. 3 correspond to the protection level authentication unit 230, the protection level control unit 210, the security algorithm storage unit 220 and the hash value storage unit 133 of FIG. 2, respectively.

Referring to FIG. 3, the processor apparatus 110 can include a plurality of switches S11, S1, S2, S3 and S4. The switches S1, S2 and S3 are respectively disposed between the bus interconnector 120 and the IP blocks 141, 142 and 143 for the purpose of performing a security operation. In addition, the switch S4 is disposed between the security control unit 130 and the bus interconnector 120.

In addition, the processor apparatus 110 may further include switches S5 and S6. The switches S5 and S6 are respectively disposed between the bus interconnector 120 and a random number generator 331 and between the bus interconnector 120 and a security key unit 333.

The switches S1, S2, S3, and S4 can be turned on or off in response to the control of the protection level authentication unit 320. In addition, the switches S5 and S6 can be turned on or off in response to the control of the protection level authentication unit 320.

The processor apparatus 110 may further include an interface 310. The interface 310 performs various data receiving/transmitting operations between the processor apparatus 110 and an external user.

The random number generator 331 generates a random number that can be used to perform a security algorithm.

The security key unit 333 stores security keys, which can be used by the security algorithm unit 323 and another security algorithm unit (not shown) that is separately provided. The other security algorithm unit, which is separately provided, stores a security algorithm. The security algorithm includes the above-mentioned hash algorithm, and may be a secret key based algorithm, a public key based algorithm, or the like. An example of the secret key based algorithm may include a Data Encryption Standard (DES) algorithm, a 3DES algorithm, an Advanced Encryption Standard (AES) algorithm, and the like. An example of the public key based algorithm may include a Rivest-Shamir-Adelman (RSA) algorithm, an Error Checking & Correction (ECC) algorithm, and the like.

In order to perform a general security operation, data, for example a random number, having non-periodicity and non-crystallization is generated, and a security key is stored. In addition, the security algorithm unit that is separately provided may perform the general security operation based on the security algorithm by using the security key stored in the security key unit 333.

Referring to FIG. 4, the boot memory 160 outputs a predetermined boot code in response to the control of the CPU 114 (operation 405). The boot memory 160 outputs the predetermined boot code and transmits the predetermined boot code to the security control unit 130.

The security control unit 130 converts the predetermined boot code to a hash value by using a hash engine that is included in the security control unit 130. The hash value resulting from the conversion is compared to a predetermined hash value stored in the hash value storage unit 325 and is evaluated (operation 410). The security control unit 130 determines whether the hash value converted by the hash engine included in the security control unit is identical to the predetermined hash value output from the hash value storage unit 325. The predetermined boot code is converted in the security algorithm storage unit 220 (see FIG. 2). In particular, operation 410 can be performed in the protection level control unit 210 (see FIG. 2).

According to the determination result of operation 410, it is determined whether the user is authenticated or whether the user has the right to access (operation 415). In one embodiment, operation 415 can be performed in the protection level authentication unit 320.

The predetermined boot code output in operation 405 is a boot code (hereinafter, referred to as a 'first boot code') related to a booting operation of the processor apparatus 110. When the hash value (which is a value converted from the first boot code via the security algorithm unit 323) of operation 410 is identical to the user authentication hash value h1 stored in the hash value storage unit 325, it is determined in operation 415 that a user in need of a booting operation is an authorized user.

Then, a normal booting operation of the processor apparatus 110, which corresponds to the first boot code, is started (operation 420).

In more detail, the first boot code is a boot code which is output from the boot memory 160 in response to the control of the CPU 114 when the CPU 114 requests performance of the booting operation of the processor apparatus 110. In addition, a user authentication hash value is a hash value corresponding to the first boot code that is not falsified. The hash value storage unit 325 outputs the user authentication hash value to the protection level control unit 321 in response to a booting request output from the CPU 114.

As a result of the determination of operation 410, when it is determined that the first boot code is not identical to the user authentication value, it is determined in operation 415 that a user has no right to request performance of the booting operation. Thus, it is determined that a booting failure has occurred. When it is determined that a booting failure has occurred, the security control unit 131 (in detail, the protection level authentication unit 320) can stop all operations of the processor apparatus 110.

When the boot code output in operation 405 is a boot code (hereinafter, referred to as a 'second boot code') for performing a debugging operation of the processor apparatus 110, the processor apparatus 110 operates as follows.

When the hash value (which is a value converted from the second boot code via the security algorithm unit 323) of operation 410 is identical to a first access authentication hash value h2 stored in the hash value storage unit 325, it is determined that a debugging request is authentic, in operation 415.

Then, the protection level authentication unit 320 activates the JTAG port 112, and connects the JTAG port 112 to the CPU 114 (operation 425). The protection level authentication unit 320 may control the switch S11 to be turned on.

In more detail, the second boot code is a boot code which is output from the boot memory 160 in response to the control of the CPU 114 when an external user requests performance of the debugging operation of the processor apparatus 110. In addition, the first access authentication hash value h2 is a hash value corresponding to the second boot code that is not falsified. The hash value storage unit 325 outputs the first access authentication hash value to the protection level control unit 321 in response to a debugging request output from the CPU 114.

As a result of the determination result of operation 410, when the second boot code is not identical to the first access authentication hash value, the JTAG port 112 is not connected to the CPU 114. When the switch S11 is further provided, the switch S11 is controlled to be turned off.

In particular, according to the determination result of operation 410, the protection level authentication unit 230 allows or releases the connection between the JTAG port 112 and the CPU 114. Thus, when the debugging is performed by the JTAG port 112, an ill-intentioned user can be prevented from changing an inner structure of the processor apparatus 100 or from falsifying data stored in the processor apparatus 100.

When the boot code output in operation 405 is a boot code (hereinafter, referred to as a 'third code') in which an external user requests access to a predetermined IP block, the processor apparatus 110 operates as follows.

When the hash value of operation 410 (which is a value converted from the third boot code via the security algorithm unit 323) is identical to a second access authentication hash value h3 stored in the hash value storage unit 325, it is determined that a request to access the predetermined block is authentic, in operation 415. Hereinafter, the case where the 'predetermined IP block' is a second IP block 142 will be described.

Then, the protection level authentication unit 320 connects the bus interconnector 120 to the second IP block 142. That is, since the access request is determined to be right, the access to the predetermined IP block is allowed (operation 430). When the switch S2 is further provided, the switch S2 is controlled to be turned on. Then, a user requesting access to the predetermined IP block can access to the predetermined IP block.

In detail, the third boot code is a boot code which is output from the boot memory 160 in response to the control of the CPU 114 when access to the predetermined IP block is requested from the external user to the CPU 114. In addition, the second access authentication hash value h3 is a hash value corresponding to the third boot code that is not falsified. The hash value storage unit 325 outputs the second access authentication hash value h3 to the protection level control unit 321 in response to the CPU 114.

As a result of the determination result of operation 410, when it is determined that the third boot code is not identical to the second access authentication hash value h3, it is determined that a user has no right to access the predetermined IP block, in operation 415. Then, the protection level authentication unit 320 prevents the user from having access to the predetermined IP block (operation 435). When the switch S2 is further provided, the protection level authentication unit 320 controls the switch S2 to be turned off.

Security for the predetermined IP block may be obtained prior to security for the processor apparatus 110, based on a debugging operation. For example, it is assumed that even if operation 425 proceeds when it is determined that the debugging operation is authentic, the access to the predetermined block (e.g., the second IP block 142) is not allowed. Then, the debugging operation with respect to the second IP block cannot be performed.

In addition, the hash value storage unit 325 may store hash values corresponding to boot codes requesting various right authentications. For example, when a boot code requesting that IP blocks be tested, a boot code requesting all chips to be tested, a boot code requesting access authentication to at least one IP block, or the like, may be further provided, hash values corresponding to the boot codes may be stored. Thus, the protection level authentication unit 320 may perform authentication of various rights with respect to users.

As described above, the processor apparatus 110 includes the hash value storage unit 325. Hash values respectively corresponding to a plurality of boot codes are stored in the hash value storage unit 325. The hash value storage unit 325 is not available external to the processor apparatus 110. According to the inventive concept, user authentication or predetermined right authentication (that is, allowance of a predetermined access request or a predetermined operation request) is performed using a hash value from among hash values stored in the hash value storage unit 325, which corresponds to the predetermined boot code. Thus, the processor apparatus 110 can maintain both security for the debugging operation of the processor apparatus 110 and security for important modules (IP blocks) of the processor apparatus 110.

FIG. 5 is a table for explaining interface timing of a boot memory, according to an embodiment of the inventive concept.

Referring to FIG. 5, a block erase time, a 4 KB program time, a fast read access time, a 4 KB read access time and erase/program endurance, which are required to store a data value while changing the data value stored in the boot memory, are shown.

The processor apparatus 110 includes the hash value storage unit 325. Thus, in order for an ill-intentioned user to have access to a predetermined IP block of a processor apparatus or to perform a predetermined function (a debugging operation, a boot operation, a test operation, etc.), a boot code corresponding to a predetermined hash value stored in the hash value storage unit 325 needs to be determined.

In order to determine the boot code corresponding to the predetermined hash value, a boot code stored in the boot memory continues to be stored and to be read while being changed, and booting is needed to determine the stored boot code. Likewise, a time required to change/store a boot code and a time required for booting equals the sum of times shown in FIG. 5. In FIG. 5, the case where the length of boot code is 4 KB is shown.

First, since data of a pertaining block needs to be deleted in order to store a new boot code, a block erase time of 700 milli-seconds (ms) is required. In addition, since a value of a new boot code needs to be programmed, a 4 KB program time is required. In order to read the programmed value for booting, a fast read access time and a 4 KB read access time are required. Thus, in order to change and output a single boot code value, a total of about 718 ms is required.

A calculated value of 718 ms is the minimum timing required in an operational memory. However, an actual time used for a memory interface is much longer than 718 ms. In addition, a longer time than 718 ms is required to check whether a program having a boot value, which is performed in a boot memory, is normally finished.

If a boot code of 4 KB is converted to a hash value of 160 bits, a boot code corresponding to a predetermined hash value exists once every 160 multiplications. That is, in order to determine a predetermined hash value stored in the processor apparatus according to the present embodiment, 160 multiplications of 718 ms are required in terms of probability.

Thus, when a hash value corresponding to a boot code is internally stored in a processor apparatus, and cannot be externally exposed, it is impossible for an ill-intentioned user to access the processor apparatus by falsifying the boot code. This is because a very long time is required to get permission to access the processor apparatus while changing the boot code.

In addition, erasing/programming cycles of contemporary boot memory can be limited, for example, on the order of one hundred thousand times. That is, after data is erased and recorded one hundred thousand times, a pertaining boot memory cannot be used. Thus, several tens of boot memories need to be used for a single hacking attempt with respect to the processor apparatus, and hacking costs are increased. Thus, hacking becomes very difficult.

According to the inventive concept, a processor apparatus can ensure high security with respect to an ill-intentioned user.

While the inventive concept has been particularly shown and described with reference to exemplary embodiments thereof, it will be understood that various changes in form and details may be made therein without departing from the spirit and scope of the following claims.

What is claimed is:

1. A processor apparatus capable of operating in a security mode, the processor apparatus comprising:
   a hash value storage unit that stores a plurality of hash values including a user authentication hash value and a plurality of access authentication hash values;
   a security control unit that checks whether a plurality of boot codes transmitted from a boot memory and at least one hash value from among the hash values, which corresponds to the plurality of boot codes, are identical, and that determines whether a boot operation is allowed,
   wherein the security control unit checks whether a second boot code transmitted from the boot memory and at least one hash value from among the hash values, which corresponds to the second boot code, are identical, and that selectively determines whether a debugging operation of the processor apparatus is allowed,
   wherein the security control unit checks whether a third boot code transmitted from the boot memory and at least one hash value from among the hash values, which corresponds to the third boot code, are identical, and that determines whether an external user is allowed to have access to a predetermined intellectual property (IP) block, and
   wherein the access authentication values are not output external to the processor apparatus, and are read by the security control unit, wherein the security control unit comprises:
   a security algorithm unit storing a hardwired type security algorithm;

a security level control unit determining whether the boot code is identical to a hash value corresponding to the boot code of the hash values; and a security level authentication unit determining whether a hash value from among the hash values, which corresponds to the boot code, is identical to the boot code, according to a result of the determination and adjusting and controlling an operation corresponding to the boot code.

2. The processor apparatus of claim 1, wherein the security control unit determines whether a first boot code, which is transmitted when booting of the processor apparatus is requested, is falsified, by using the user authentication hash value and the user authentication hash value is a hash value corresponding to the first boot code that is not falsified.

3. The processor apparatus of claim 2, wherein the first boot code is a boot code which is output from the boot memory in response to control by a central processing unit (CPU) when the CPU requests the processor apparatus to perform a booting operation.

4. The processor apparatus of claim 2, wherein the security control unit determines whether a value, which is converted from the first boot code by using a hash engine internally included in the processor apparatus, is identical to the user authentication hash value, and performs the booting operation when the value converted from the first boot code is identical to the user authentication hash value.

5. The processor apparatus of claim 2, wherein the security control unit stops all operations of the processor apparatus when a value converted from the first boot code by using a hash engine internally included in the processor apparatus is not identical to the user authentication hash value.

6. The processor apparatus of claim 1, further comprising:
a CPU; and
a joint test action group (JTAG) port performing a debugging operation of the processor apparatus.

7. The processor apparatus of claim 6, wherein the security control unit determines whether the JTAG port is allowed to be connected to the CPU according to a first access authentication hash value of the access authentication hash values.

8. The processor apparatus of claim 7, wherein the security control unit determines whether the JTAG port is allowed to be connected to the CPU according to whether the first access authentication hash value is identical to the second boot code transmitted when a debugging operation is requested.

9. The processor apparatus of claim 8, wherein the second boot code is a boot code which is output from the boot memory in response to control by the CPU when the CPU is requested to perform the debugging operation.

10. The processor apparatus of claim 9, wherein the first access authentication hash value is a hash value corresponding to the second boot code that is not falsified.

11. The processor apparatus of claim 8, wherein the security control unit connects the JTAG port to the CPU when it is determined that the first access authentication hash value is identical to a value that is converted from the second boot code by using a hash engine internally included in the processor apparatus.

12. The processor apparatus of claim 8, wherein the security control unit separates the JTAG port and the CPU when it is determined that the first access authentication hash value is not identical to a value that is converted from the second boot code by using a hash engine internally included in the processor apparatus.

13. The processor apparatus of claim 1, further comprising a plurality of IP blocks designed to have independent predetermined functions,
wherein the predetermined IP block is at least one IP block from among the plurality of IP blocks, which requires a security operation for access.

14. The processor apparatus of claim 13, wherein the security control unit determines whether the external user is allowed to have access to the predetermined IP block by using a second access authentication hash value of the access authentication hash values.

15. The processor apparatus of claim 14, wherein the security control unit determines whether the second access authentication hash value is identical to the third boot code which is output from the boot memory when access to the predetermined IP block is requested, and determines whether the access is allowed according to a determination result.

16. The processor apparatus of claim 15, wherein the second access authentication hash value is a hash value corresponding to the third boot code that is not falsified.

17. The processor apparatus of claim 15, wherein the security control unit allows the external user to have access to the predetermined IP block when the second access authentication hash value is identical to a value that is converted from the third boot code by using a hash engine internally included in the processing apparatus.

18. The processor apparatus of claim 17, further comprising:
a bus interconnector connecting the CPU, the at least one predetermined IP block and the security control unit to each other; and
at least one switch connecting the bus interconnector to the at least one predetermined block,
wherein the security control unit controls the at least one switch to be turned on when the second access authentication hash value is identical to a third boot code.

* * * * *